(12) United States Patent
Sha et al.

(10) Patent No.: US 12,287,004 B2
(45) Date of Patent: Apr. 29, 2025

(54) METHOD AND APPARATUS FOR DETECTING WEAR DATA OF PROTECTIVE BEARING

(71) Applicant: TIANJIN EMAGING TECHNOLOGY CO., LTD., Tianjin (CN)

(72) Inventors: Honglei Sha, Tianjin (CN); Tianye Yu, Tianjin (CN); Shenping Hong, Tianjin (CN); Cunyu Yi, Tianjin (CN); Wanhu Liu, Tianjin (CN); Kai Li, Tianjin (CN); Jingchao Han, Tianjin (CN)

(73) Assignee: TIANJIN EMAGING TECHNOLOGY CO., LTD., Tianjin (CN)

(*) Notice: Subject to any disclaimer, the term of this patent is extended or adjusted under 35 U.S.C. 154(b) by 0 days.

(21) Appl. No.: 17/760,649

(22) PCT Filed: Aug. 2, 2021

(86) PCT No.: PCT/CN2021/110106
§ 371 (c)(1),
(2) Date: Mar. 15, 2022

(87) PCT Pub. No.: WO2022/166138
PCT Pub. Date: Aug. 11, 2022

(65) Prior Publication Data
US 2024/0044366 A1 Feb. 8, 2024

(30) Foreign Application Priority Data
Feb. 5, 2021 (CN) .......................... 202110158056.X

(51) Int. Cl.
*F16C 32/04* (2006.01)

(52) U.S. Cl.
CPC ...... *F16C 32/0451* (2013.01); *F16C 2233/00* (2013.01)

(58) Field of Classification Search
CPC .............. F16C 32/0451; F16C 2233/00; F16C 32/0444; F16C 2361/00; F16C 32/0474; G01M 13/045; G01M 13/04
See application file for complete search history.

(56) References Cited

U.S. PATENT DOCUMENTS

2002/0164243 A1* 11/2002 Namiki ................. F04D 19/048
    415/17
2008/0234964 A1    9/2008 Miyasaka et al.
(Continued)

FOREIGN PATENT DOCUMENTS

CN    103196671 A    7/2013
CN    103196672 A    7/2013
(Continued)

OTHER PUBLICATIONS

Extended European Search Report for Application No. 21859318.4-1001, dated Oct. 26, 2022, 9 Pages.
(Continued)

*Primary Examiner* — Matthew G Marini
*Assistant Examiner* — Leo T Hinze
(74) *Attorney, Agent, or Firm* — BROOKS KUSHMAN P.C.

(57) ABSTRACT

A method and an apparatus for detecting wear data of a protective bearing, which relates to the technical field of a magnetic suspension bearing, and includes: firstly, a displacement of a rotor is acquired in a current falling process; then, contact time between the rotor and the protective bearing is determined according to the displacement, and a rotation speed of the rotor at any moment in the contact time is acquired, and then current wear information of the pro- (Continued)

tective bearing is determined based on the displacement and the rotation speed; finally, historical wear information of the protective bearing is acquired, and the historical wear information and the current wear information are added to obtain total wear information of the protective bearing, wherein the total wear information is used for reflecting a state of the protective bearing.

15 Claims, 2 Drawing Sheets

(56) References Cited

U.S. PATENT DOCUMENTS

| | | | |
|---|---|---|---|
| 2012/0272736 A1 | 11/2012 | Griffaton | |
| 2017/0268519 A1* | 9/2017 | Kozaki | F04D 29/058 |
| 2021/0391778 A1* | 12/2021 | Pederson | H02K 7/025 |

FOREIGN PATENT DOCUMENTS

| | | |
|---|---|---|
| CN | 104457649 A | 3/2015 |
| CN | 106950062 A | 7/2017 |
| CN | 107220456 A | 9/2017 |
| CN | 206756458 U | 12/2017 |
| CN | 109139691 A | 1/2019 |
| CN | 109655265 A | 4/2019 |
| CN | 111308252 A | 6/2020 |
| CN | 112504677 A | 3/2021 |
| JP | H09210861 A | 8/1997 |
| JP | 2017227639 A | 12/2017 |
| KR | 101891821 B1 | 8/2018 |
| WO | 2019086123 A1 | 5/2019 |

OTHER PUBLICATIONS

First Office Action for Chinese Application No. 202110158056.X, dated Mar. 23, 2021, 15 Pages (including English Translation).
Notice of Allowance for Chinese Application No. 202110158056.X, dated Mar. 30, 2021, 8 Pages (including English Translation).
Yili, Zhu, "Research on New type Catcher Bearings in Active Magnetic Bearing System," Thesis, Oct. 2013, Nanjing University of Aeronautics and Astronautics, The Graduate School College of Mechanical and Electrical Engineering, 124 Pages (including English title page and abstract).
Yu, et al., "Dynamic Analysis of Magnetic Bearing Rotor Dropping on Radial and Axial Integrated Auxiliary Bearing," Mechanism and Machine Theory, 2019, vol. 140, pp. 622-640, ISSN 0094-114X, https://doi.org/10.1016/j.mechmachtheory.2019.06.015 (19 Pages).
International Search Report and Written Opinion for Application No. PCT/CN2021/110106, dated Nov. 2, 2021, 10 Pages.

\* cited by examiner

METHOD AND APPARATUS FOR DETECTING WEAR DATA OF PROTECTIVE BEARING

CROSS-REFERENCE TO RELATED APPLICATIONS

This application is the U.S. national phase of PCT Application No. PCT/CN2021/110106 filed on Aug. 2, 2021, which claims priority to Chinese Patent Application No. 202110158056.X filed on Feb. 5, 2021, both of which are hereby incorporated herein by reference in their entireties.

TECHNICAL FIELD

The present disclosure relates to, but is not limited to, the technical field of magnetic suspension bearing, in particular to a method and an apparatus for detecting wear data of a protective bearing.

BACKGROUND

In some technologies, in an online evaluation method of a state of a protective bearing, a way of installing a pressure sensor at a position of the protective bearing is usually used for directly measuring physical quantities such as a collision force. However, this method involves a complex structure and relatively high costs. In addition, the pressure sensor is prone to damages when a rotor collides with the protective bearing, so reliability of this method is poor.

To sum up, in some technologies, there are some technical problems such as complex structure, high costs, and poor reliability due to the need of installation of a pressure sensor.

SUMMARY

The following is a summary of subject matters described in detail herein. This summary is not intended to limit the protection scope of the claims.

Embodiments of the present disclosure provide a method and an apparatus for detecting wear data of a protective bearing, which may alleviate the technical problems of a complex structure, high costs, and poor reliability caused by a need of installation of a pressure sensor in the prior art.

In a first aspect, an embodiment of the present disclosure provides a method for detecting wear data of a protective bearing, which includes: acquiring a displacement of a rotor in a current falling process; determining contact time of the rotor and the protective bearing according to the displacement, and acquiring a rotation speed of the rotor at any moment during the contact time; determining current wear information of the protective bearing based on the displacement and the rotation speed; wherein the current wear information is used for reflecting a wear degree of the rotor to the protective bearing in the current falling process; acquiring historical wear information of the protective bearing, and adding the historical wear information to the current wear information to obtain total wear information of the protective bearing; wherein the historical wear information is used for reflecting a wear degree of the rotor to the protective bearing in a historical falling process, and the total wear information is used for reflecting a state of the protective bearing.

In an exemplary embodiment, determining the current wear information of the protective bearing based on the displacement and the rotation speed includes: calculating a current friction value of the protective bearing according to the rotation speed and a preset friction formula, or according to the displacement, the rotation speed, and a preset friction formula; calculating a current collision value of the protective bearing according to the displacement and a preset collision formula; normalizing the current friction value and the current collision value respectively to obtain a normalized friction value and a normalized collision value; and determining the current wear information of the protective bearing based on the normalized friction value, the normalized collision value, and a first preset evaluation formula.

In an exemplary embodiment, determining the current wear information of the protective bearing based on the normalized friction value and the normalized collision value includes: determining the current wear information of the protective bearing based on the normalized friction value, the normalized collision value, and a first preset evaluation formula.

In an exemplary embodiment, the method further includes: determining whether the rotor whirls or not by performing time domain and frequency spectrum analysis on the displacement; determining the current wear information of the protective bearing based on the normalized friction value and the normalized collision value includes: determining the current wear information of the protective bearing based on the normalized friction value, the normalized collision value, and a second preset evaluation formula when the rotor whirls.

In an exemplary embodiment, the method further includes: acquiring a current temperature value of the protective bearing; normalizing the current temperature value to obtain a normalized temperature value; determining the current wear information of the protective bearing based on the normalized friction value and the normalized collision value includes: determining the current wear information of the protective bearing based on the normalized friction value, the normalized collision value, the normalized temperature value, and a third preset evaluation formula.

In an exemplary embodiment, the method further includes calculating a ratio between the total wear information and preset maximum allowable wear information to obtain a ratio result.

In an exemplary embodiment, the method further includes: displaying the ratio result in a target display mode, wherein the target display mode includes at least one of following: progress bar, percentage, and indicator light.

In an exemplary embodiment, the method further includes: alarming when the total wear information exceeds a preset alarm threshold, and/or performing a shutdown operation on a magnetic suspension bearing system where the protective bearing is located when the total wear information exceeds a preset shutdown threshold.

In a second aspect, an embodiment of the present disclosure further provides an apparatus for detecting wear data of a protective bearing, which includes: an acquisition unit configured to acquire a displacement and a rotation speed of a rotor in a current falling process; a determination-and-acquisition unit configured to determine contact time of the rotor and the protective bearing according to the displacement, and acquire a rotation speed of the rotor at any moment during the contact time; a determination unit, configured to determine current wear information of the protective bearing based on the displacement and the rotation speed; wherein the current wear information is used for reflecting a wear degree of the rotor to the protective bearing in the current falling process; an acquisition-and-addition unit configured to acquire historical wear information of the protective bearing, and add the historical wear information to the current wear information to obtain total wear information of the protective bearing; wherein the historical wear information is used for reflecting a wear degree of the rotor to the protective bearing in a historical falling process, and the total wear information is used for reflecting a state of the protective bearing.

In an exemplary embodiment, the determination unit includes a first calculation module, a second calculation module, a first normalization processing module, and a determination module.

The first calculation module is configured to calculate a current friction value of the protective bearing according to the rotation speed and a preset friction formula, or according to the displacement, the rotation speed, and a preset friction formula.

The second calculation module is configured to calculate a current collision value of the protective bearing according to the displacement and a preset collision formula.

The first normalization processing module is configured to normalize the current friction value and the current collision value respectively to obtain a normalized friction value and a normalized collision value.

The determination module is configured to determine the current wear information of the protective bearing based on the normalized friction value and the normalized collision value.

In an exemplary embodiment, determination module determining the current wear information of the protective bearing based on the normalized friction value and the normalized collision value includes: the current wear information of the protective bearing is determined based on the normalized friction value, the normalized collision value, and a first preset evaluation formula.

In an exemplary embodiment, the determination unit further includes a time domain and frequency spectrum analysis module; wherein the time domain and frequency spectrum analysis module is configured to determine whether the rotor whirls or not by performing time domain and frequency spectrum analysis on the displacement; the determination module determining the current wear information of the protective bearing based on the normalized friction value and the collision normalized includes: the current wear information of the protective bearing is determined based on the normalized friction value, the normalized collision value, and a second preset evaluation formula when the rotor whirls.

In an exemplary embodiment, the determination unit further includes an acquisition module and a second normalization processing module.

The acquisition module is configured to acquire a current temperature value of the protective bearing.

The second normalization processing module is configured to normalize the current temperature value to obtain a normalized temperature value.

The determination module determining the current wear information of the protective bearing based on the normalized friction value and the normalized collision value includes: the current wear information of the protective bearing is determined based on the normalized friction value, the normalized collision value, the normalized temperature value, and a third preset evaluation formula.

In an exemplary embodiment, the apparatus further includes a calculation unit, a display unit, and an alarm and shutdown unit.

The calculation unit is configured to calculate a ratio between the total wear information and preset maximum allowable wear information to obtain a ratio result.

The display unit is configured to display the ratio result in a target display mode, wherein the target display mode includes at least one of following: progress bar, percentage, and indicator light.

The alarm and shutdown unit is configured to give an alarm when the total wear information exceeds a preset alarm threshold, and/or to perform a shutdown operation on a magnetic suspension bearing system where the protective bearing is located when the total wear information exceeds a preset shutdown threshold.

In a third aspect, an embodiment of the present disclosure further provides a computer-readable medium with non-volatile program codes executable by a processor, wherein the program codes enable the processor to perform the method for detecting wear data of a protective bearing.

Other aspects will become apparent upon reading and understanding of the drawings and detailed description.

BRIEF DESCRIPTION OF DRAWINGS

Accompanying drawings are used for providing a further understanding of technical solutions of the present application, and constitute a part of the specification. They are used for explaining the technical solutions of the present application together with the embodiments of the present application, and do not constitute limitations on the technical solutions of the present application.

REFERENCE SIGNS

Figure 1:
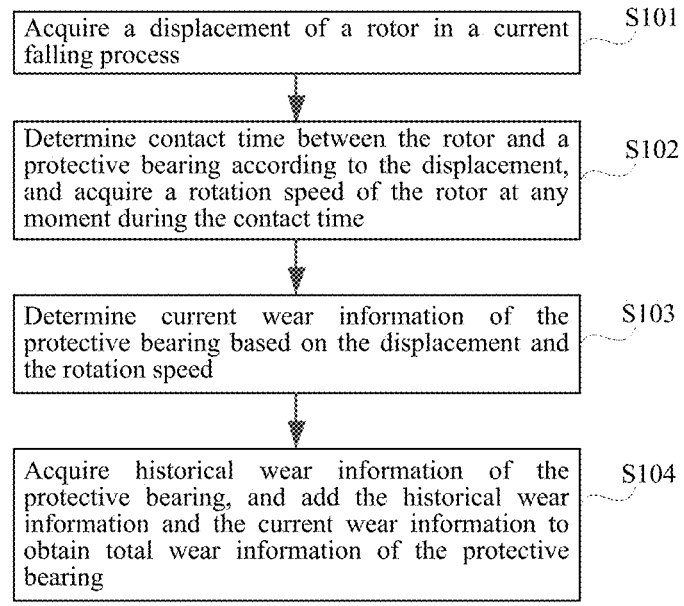
FIG. 1 is a flowchart of a method for detecting wear data of a protective bearing according to an embodiment of the present application.

1—Central Processing Unit (CPU); 2—Memory; 3—Power amplifier; 4—Speed sensor; 5—First actuator of magnetic suspension bearing; 6—Protective bearing; 7—Second actuator of magnetic suspension bearing; 8—Displacement sensor; 9—Analog to Digital (A/D) conversion module; 10—Rotor; 11—Acquisition unit; 12—Determination-and-acquisition unit; 13—Determination unit; 14—Acquisition-and-addition unit.

DETAILED DESCRIPTION

Hereinafter, the embodiments of the present disclosure will be described in detail with reference to the accompanying drawings. The embodiments in the present application and the features in the embodiments may be combined with each other randomly if there is no conflict.

Steps shown in flowcharts of the drawings may be performed in a computer system such as a set of computer-executable instructions. In addition, although a logical order is shown in a flowchart, in certain cases, the steps shown or described may be performed in a different order from those described here.

A protective bearing, also known as an auxiliary bearing, a spare bearing, etc., is an indispensable constituent part of a magnetic suspension bearing system. Its function is to undertake landing of a rotor when the rotor falls down in case of failure of a magnetic suspension bearing, and provide spare support to protect a magnetic bearing, a seal, and other components from scratching. Falling of a rotor is usually accompanied by physical processes such as impact, whirl, and friction. Each time of falling will cause a certain amount of wear to the protective bearing. With increase of times of falling, the protective bearing may fail, lose its protective ability, or even be locked up, causing further damage to a unit. Therefore, it is very necessary to evaluate a state of the protective bearing. Shutdown inspection is mainly used in an existing method for evaluating a state of a protective bearing, and such method requires sensor calibration, cranking, or dismantling to check when equipment is in a shutdown state. Through the above-mentioned method of shutdown inspection, not only a process is cumbersome, but also the protective bearing is often operated "regardless of danger" due to untimely maintenance, and once the rotor falls again, the equipment will be seriously damaged.

In order to overcome shortcomings of the method of shutdown inspection, an online evaluation method came into being. In some technologies, on-line evaluation methods are divided into two types. One type is to directly measure physical quantities such as a collision force by installing a pressure sensor at a position of a protective bearing, with defects of: relatively complex structure, high costs, the pressure sensor being prone to damages during a fall collision, and poor reliability. A reason for the above complex structure is that the pressure sensor needs to be installed at an inner ring or outer ring of a rolling bearing, which leads to a complex mechanical structure itself. Especially when the pressure sensor is installed at the inner ring, it is necessary to prevent the pressure sensor from falling off under a centrifugal force with high-speed rotation of the inner ring. The other type is to adopt a method of counting times of falling, that is, each time the falling occurs, it is recorded as one time, and when a counted time of falling reaches a preset value, a protective bearing will be replaced.

To sum up, when using the method of installing a pressure sensor at a position of a protective bearing, a structure is complex, a cost is high, a pressure sensor is prone to damages during a fall collision, and reliability is poor. The method for evaluating a protective bearing by counting times of falling is too simple. Because of a relatively large difference in wear caused by each time of falling, simply guiding replacement of the protective bearing according to the times of falling is prone to wrong diagnosis, for example, a protective bearing in good condition guided to be replaced or failure in guiding replacement in time when a protective bearing is already in poor condition.

Based on this, the present disclosure provides a method and an apparatus for detecting wear data of a protective bearing, according to which it is no longer necessary to install a pressure sensor on the protective bearing, and current wear information of the protective bearing may be indirectly obtained by acquiring a displacement and a rotation speed of a rotor in a current falling process, and then total wear information of the protective bearing may be obtained. Therefore, the present application may avoid technical problems of a complex structure, high costs, and poor reliability caused by the need to installation of a pressure sensor, and has beneficial effects of a simple structure, low costs, and strong reliability.

In order to facilitate understanding of the embodiments, firstly, a method for detecting wear data of a protective bearing disclosed in an embodiment of the present application will be described in detail.

Embodiment 1

According to the embodiment of the present disclosure, an embodiment of a method for detecting wear data of a protective bearing is provided. It should be noted that steps shown in a flowchart of a drawing may be executed in a computer system such as a set of computer-executable instructions, and although a logical order is shown in a flowchart, in some cases, steps shown or described may be executed in a different order from those described here.

FIG. 1 is a flowchart of a method for detecting wear data of a protective bearing according to an embodiment of the present application. As shown in FIG. 1, the method includes steps S101~S104.

In S101, a displacement of a rotor in a current falling process is acquired.

Figure 2:
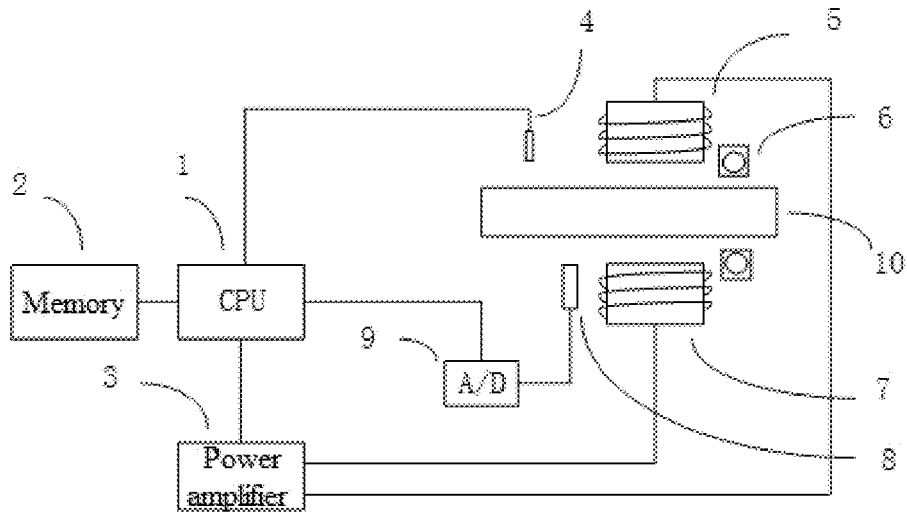
FIG. 2 is a schematic diagram of a structure of a magnetic suspension bearing system according to an embodiment of the present application.

In the embodiment of the present application, the displacement may be collected by a displacement sensor in a magnetic suspension bearing system where the rotor is located. A falling process may be divided into two processes. A first process is characterized by: the rotor falls down, but the rotor is not in contact with a protective bearing; a second process is characterized by contact between the rotor and the protective bearing. The above displacement may refer to a falling distance of the rotor in a direction perpendicular to the protective bearing, and at this time, a position where the rotor is normally suspended is determined as a starting position by default. In this embodiment, the displacement involved refers to a displacement at any moment of data acquisition, and is a physical concept. A "displacement" is equivalent to a "position", and a "displacement sensor" is a "position sensor". As shown in FIG. 2, a structure of the magnetic suspension bearing system includes but is not limited to following modules: a CPU 1, a memory 2, a power amplifier 3, a speed sensor 4, a first actuator 5 of the magnetic suspension bearing, a protective bearing 6, a second actuator 7 of the magnetic suspension bearing, a displacement sensor 8, an A/D conversion module 9, and a rotor 10. The method for detecting wear data of the protective bearing according to the embodiment of the present application may be applied to the magnetic suspension bearing system. In an exemplary embodiment, a rotation speed may be acquired in following two acquisition ways: a first acquisition way is to collect the rotation speed directly and in real time using the speed sensor 4; a second acquisition way is to obtain the rotation speed indirectly by performing Fourier transform on the above displacement. When the second acquisition way is used, the speed sensor 4 in the magnetic suspension bearing system may be eliminated.

In S102, contact time between the rotor and a protective bearing is determined according to the displacement, and a rotation speed of the rotor at any moment during the contact time is acquired.

The contact time in the embodiment of the present application is a period of time. In the embodiment of the present application, the displacement of the rotor 10 in a falling process may be denoted as displacement x, and a normal maximum displacement value A when the rotor 10 falls on the protective bearing 6 may be set. In a process of contact between the rotor and the protective bearing, the displacement x is greater than or equal to the normal maximum displacement value A. Therefore, the contact time between the rotor and the protective bearing may be determined according to a relationship between the displacement x and the normal maximum displacement value A. In this embodiment, the contact time herein is a period of time, timing starts when the displacement x of the rotor changes from less than A to greater than A, and the timing ends when the displacement x changes from greater than A to less than A.

In S103, current wear information of the protective bearing is determined based on the displacement and the rotation speed.

In the embodiment of the present application, the current wear information is used for reflecting a wear degree of the rotor to the protective bearing in a current falling process. The above protective bearing includes, but is not limited to, a rolling bearing and a sliding bearing. Contents contained in the current wear information is not limited in the embodiment of the present application, and may include but are not limited to the following: a current friction value, current collision value, and current temperature value without normalization, and may also include but are not limited to the following: a normalized friction value, a normalized collision value, and a current temperature value which are obtained after a normalization processing.

In S104, historical wear information of the protective bearing is acquired, and the historical wear information and the current wear information are added to obtain total wear information of the protective bearing. Among them, the historical wear information is used for reflecting a wear degree of the rotor to the protective bearing during a historical falling process, and the total wear information is used for reflecting a state of the protective bearing. The total wear information obtained this time is saved as new historical wear information. In this way, in a next falling process, historical wear information is previous total wear information.

According to the method for detecting the wear data of protective bearing according to the embodiment of the present application, differences between the embodiment of the present application and state evaluation methods in some technologies include: objects measured by sensors are different, and objects measured by the state evaluation methods in some technologies are bearings themselves, which are direct measurement and evaluation methods. However, an object to be measured in the embodiment of the present application is a rotor, and a state of a protective bearing is indirectly evaluated through a behavior of the rotor, the method for detecting the wear data of protective bearing according to the embodiment of the present application is an indirect evaluation method. According to the method for detecting the wear data of the protective bearing according to the embodiment of the present application, the wear data of the protective bearing may be obtained, and the wear data at least includes total wear information. In addition, in the embodiment of the present application, there is no need to install a sensor at an inner ring or outer ring of the protective bearing, that is, there is no need to install a sensor for the protective bearing.

Signal collection based on the displacement sensor 8 and the speed sensor 4 in the embodiment of the present application is measurement of the behavior of the rotor. When the rotor is normally suspended and not in a current falling process, the displacement sensor 8 and the speed sensor 4 mainly serve to control suspension of the magnetic suspension bearing. Therefore, the embodiment of the present application only extends functions of the displacement sensor and the speed sensor which are indispensable for suspension control. When the rotor is in the current falling process, there is no need to install a pressure sensor on the protective bearing. By acquiring a displacement of the rotor in the current falling process and acquiring a rotation speed of the rotor at any moment during contact time between the rotor and the protective bearing, current wear information of the protective bearing may be indirectly obtained, and further, total wear information of the protective bearing may be obtained. Therefore, the embodiment of the present application may avoid technical problems of a complex structure, high costs, and poor reliability caused by the need of installation of a pressure sensor, and has beneficial effects of a simple structure, low costs, and high reliability.

In an exemplary embodiment, contents of the current wear information may include, but is not limited to the following: a normalized friction value, normalized collision value, and current temperature value obtained after a normalization processing. Therefore, when the contents of the current wear information includes the following: a normalized friction value and a normalized collision value, in step S103, the current wear information of the protective bearing is determined based on the displacement and the rotation speed.

Example 1

An implementation process of determining the current wear information of the protective bearing based on the displacement and the rotation speed includes following steps S201 to S204.

In S201, according to the rotation speed and a preset friction formula or according to the displacement, the rotation speed, and a preset friction formula, a current friction value of the protective bearing is calculated. The above-mentioned friction value may also be called a friction state value, which is denoted as M.

A first preset friction formula is $M=\int(t\times n)$, where $\int$ is an integral symbol and t is contact time at a rotation speed n.

It should be noted that in the embodiment of the present application, a degree to which a displacement x collected by a displacement sensor exceeds a maximum value A may be further evaluated. At this time, it is considered that the protective bearing is a linear spring system, and its elastic coefficient is k, and $f=k\times(x-A)$ is an acting force of the rotor and the protective bearing. Wear of the protective bearing is obviously different under different acting forces f. Therefore, when a collision state value N is accumulated, it is not that a value of 1 is simply accumulated, but a value of f is accumulated. Similarly, in addition to considering a linear velocity, an influence of a contact force (or acting force) may also be considered when accumulating a friction state value, so a following formula $M=\int(t*n*f)$ is adopted for a second preset friction formula. Since the displacement x is used in the calculation formula of the acting force f above, the acting force f is affected by the displacement x. On this basis, when the second preset friction formula is used to calculate the current friction value of the protective bearing in the embodiment of the present application, it may be considered that two factors, i.e., the displacement and the rotation speed are considered at the same time.

In S202, a current collision value of the protective bearing is calculated according to the displacement and a preset collision formula. The above current collision value may also be called a collision state value, which is denoted as N. It should be noted that in an exemplary embodiment, a memory may be used for recording values of M and N, and then a state of the protective bearing is evaluated by determining whether M and N exceed a friction constant M0 and a collision constant N0 respectively.

Since the current friction value and the current collision value are data with two different units, in order to facilitate data analysis, a following step S203 is performed.

In S203, a normalization processing is performed on the current friction value and the current collision value respectively to obtain a normalized friction value and a normalized collision value.

The above-mentioned normalization processing refers to taking a maximum value of any physical quantity as a benchmark and comparing a collected or calculated value of the physical quantity with the maximum value. In the present application, it may refer to comparing the current friction value M with the friction constant M0 or comparing the current collision value N with the collision constant N0. The normalized friction value may be denoted as M/M0 and the normalized collision value may be recorded as N/N0.

A factor considered when determining the friction constant M0 needs to be consistent with that considered for the friction state value M, and a factor considered when determining the collision constant N0 needs to be consistent with that considered for the collision state value N. Therefore, when an influence of an acting force is considered for both the friction state value M and the collision state value N, the influence of the acting force also needs to be considered for calculations of M0 and N0. Or, when an influence of an acting force is not considered for both the friction state value M and collision state value N, the influence of the acting force also does not need to be considered for the calculations of M0 and N0.

Without considering the influence of the acting force, a method for determining the friction constant M0 is as follows: under an experimental condition, making a protective bearing and a rotor only have friction and no collision, and an over-fitting assembly relationship may be used for the rotor and the protective bearing, running continuously at a speed n1 until the protective bearing is damaged, time t1 and an experimental friction value $M1=fn1*t1$ are recorded. In order to eliminate contingency, it is necessary to conduct experiments on multiple protective bearings and obtain an average value M0 of multiple experimental friction values.

Without considering the influence of the acting force, a method for determining the collision constant N0 is as follows: under an experimental condition, making the rotor and the protective bearing collide continuously, and the number of times of collisions is recorded until the protective bearing is damaged, and a final number of times of collisions N1 is recorded. In order to eliminate contingency, it is necessary to conduct experiments on multiple protective bearings and obtain an average value N0 of multiple numbers of times of collisions N1.

In S204, current wear information of the protective bearing is determined based on the normalized friction value, the normalized collision value, and a first preset evaluation formula.

The two normalized values in the step S203 may be directly added to obtain the current wear information of the protective bearing. However, in order to adjust influences of the two factors i.e., friction and collision on the current wear information of the protective bearing, corresponding weight coefficients may be set for the two normalized values respectively, so the first preset evaluation formula is as follows:

$$\lambda 1 = u \times M/M0 + v \times N/N0$$

$\lambda 1$ is the current wear information of the protective bearing, M/M0 is the normalized friction value, u is a weight coefficient of the normalized friction value, N/N0 is the normalized collision value, and v is a weight coefficient of the normalized collision value. In the embodiment of the present application, u=0.5 and v=0.5 by default.

In order to improve flexibility of the first preset evaluation formula, in the embodiment of the present application, weight coefficients of different factors may be adaptively determined. That is to say, in the embodiment of the present application, values of the above two weight coefficients may be customized according to the influences of the above two factors on the current wear information of the protective bearing. It should be noted that other weight coefficients in the embodiment of the present application may also be customized according to actual situations.

Example 2

An implementation process of determining the current wear information of the protective bearing based on the displacement and the rotation speed includes following steps S201~S203 and S204~S206.

In this example, steps S201~S203 in the implementation process of determining the current wear information of the protective bearing based on the displacement and the rotation speed are the same as the steps S201~S203 in Example 1.

In order to obtain the current wear information, in addition to considering two factors of friction and collision, a factor of rotor whirl may also be taken into consideration. When the factor of rotor whirl is considered, in step S203, after the current friction value and the current collision value are respectively normalized to obtain the normalized friction value and the normalized collision value, the method may include following steps S204~S206.

In S204, it is determined whether the rotor whirls or not by performing time domain and frequency spectrum analysis on the displacement.

In S205, when the rotor whirls, the current wear information of the protective bearing is determined based on the normalized friction value, the normalized collision value, and a second preset evaluation formula.

Among them, steps S204~S205 may be performed after step S203 or before step S203, which is not specifically limited.

In S206, in order to take an influence of the factor of rotor whirl into consideration, determining the current wear information of the protective bearing based on the normalized friction value, and the normalized collision value includes: determining the current wear information of the protective bearing by using a following second preset evaluation formula.

$$\lambda 1 = B \times (u \times M/M0 + v \times N/N0)$$

Compared with the first preset evaluation formula, a weight coefficient B is added into the second preset evaluation formula, and a value of B is greater than 1. In the embodiment of the present application, the rotor whirl is determined by performing time domain and frequency spectrum analysis on the displacement of the rotor. When whirl occurs, the weight coefficient B is additionally added on a basis of the first preset evaluation formula for reflecting an extra damage effect of whirl on the protective bearing.

Example 3

An implementation process of determining the current wear information of the protective bearing based on the displacement and the rotation speed includes following steps S201~S203 and S207~S209.

In this example, steps S201~S203 in the implementation process of determining the current wear information of the protective bearing based on the displacement and the rotation speed are the same as the steps S201~S203 in Example 1.

In this example, contents of the current wear information may include, but are not limited to the following: a normalized friction value, a normalized collision value, and a current temperature value obtained after a normalization processing. As factors affecting a life of the protective bearing include temperature, in addition to considering two factors of friction and collision, a factor of temperature may also be taken into consideration. When the factor of temperature is considered, in step S203, after the current friction value and the current collision value are respectively normalized to obtain the normalized friction value and the normalized collision value, the method may include following steps S207~S209.

In S207, a current temperature value of the protective bearing is acquired.

In S208, a normalization processing is performed on the current temperature value to obtain a normalized temperature value.

Among them, steps S207~S208 may be performed after step S203 or before step S203, which is not specifically limited.

In S209, the current wear information of the protective bearing is determined based on the normalized friction value, the normalized collision value, the normalized temperature value, and a third preset evaluation formula.

In order to take an influence of the factor of temperature into consideration, the current wear information of the protective bearing may be determined using a following third preset evaluation formula.

$$\lambda 1=(u\times M/M0+v\times N/N0+w\times T/T0)$$

Among them, t is the current temperature value, wherein the current temperature value refers to a highest temperature value detected in a current friction process; T0 is a temperature constant, T/T0 is the normalized temperature value, and w is a weight coefficient of the normalized temperature value. Compared with the first preset evaluation formula, the influence of the factor of temperature is added into the third preset evaluation formula.

Example 4

An implementation process of determining the current wear information of the protective bearing based on the displacement and the rotation speed includes following steps S201~S203 and S207~S210.

In this example, the steps S201~S203 and S207~S208 in the implementation process of determining the current wear information of the protective bearing based on the displacement and the rotation speed are the same as the steps S201~S203 and S207~S208 in Example 3.

In order to obtain the current wear information of a protective bearing, when four factors i.e., friction, collision, rotor whirl, and temperature are taken into consideration, the current wear information of the protective bearing may be determined based on a normalized friction value, a normalized collision value, a normalized temperature value, and a fourth preset evaluation formula.

In order to taken influences of factors of rotor whirl and temperature into consideration at the same time, the wear information of the protective bearing may be determined using a following fourth preset evaluation formula.

$$\lambda 1=B\times(u\times M/M0+v\times N/N0+w\times T/T0)$$

Compared with the first preset evaluation formula, the influences of the factors of rotor whirl and temperature are added into the fourth preset evaluation formula at the same time.

In the above four examples, the current wear information of the protective bearing is determined based on the normalized friction value and the normalized collision value.

In an exemplary embodiment, after the step S104, the method further includes a step S105.

In S105, a ratio between the total wear information and preset maximum allowable wear information is calculated to obtain a ratio result. Total wear information $\lambda$ is a sum of current wear information $\lambda 1$ and historical wear information $\lambda 0$. The preset maximum allowable wear information may be set to a value of 1, so the ratio result is $\lambda$.

In an exemplary embodiment, after the step S105, the method further includes a step S106.

In S106, the ratio result is displayed in a target display mode, which includes at least one of following: progress bar, percentage, and indicator light.

Figure 3:
FIG. 3 is a schematic diagram of showing ratio results by progress bars.
Figure 3:
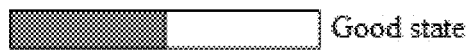
Figure 3:
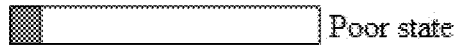

In an exemplary embodiment, the ratio result may be displayed by a progress bar. In order to directly see a state of a protective bearing, in the embodiment of the present application, a progress corresponding to a value of 1-$\lambda$ is shown. Taking three states as an example, "excellent state" means that the protective bearing is in a good running state, "good state" means that the protective bearing has been worn to some extent, but still has an anti-fall capability, and "poor state" means that the protective bearing has been worn seriously and needs to be replaced as soon as possible. As shown in FIG. 3, in FIG. 3, a progress bar is displayed according to 1-$\lambda$. For example, if 1-$\lambda$ is 80%, the progress bar accounts for 80% of a total progress length. When the value of 1-$\lambda$ is greater than a first threshold, the state of "excellent state" is displayed. When the value of 1-$\lambda$ is between the first threshold and a second threshold, the state of "good state" is displayed. When the value of 1-$\lambda$ is lower than the second threshold, the state of "poor state" is displayed. A progress bar may be replaced by displaying a percentage or lighting of an indicator light, and a specific form of the target display mode is not specifically limited in the embodiment of the present application. The number of levels of states of the protective bearing is not specifically limited in the embodiment of the present application.

In an exemplary embodiment, after the step S104, the method further includes a step S107.

In S107, an alarm is issued when the total wear information exceeds a preset alarm threshold, and/or a shutdown operation is performed on a magnetic suspension bearing system where the protective bearing is located when the total wear information exceeds a preset shutdown threshold.

On the basis of displaying a state of the protective bearing, the embodiment of the present application may also be further applied in other forms, such as setting an alarm limit (i.e. the above-mentioned alarm threshold) and/or a shutdown limit (i.e. the above-mentioned preset shutdown threshold), and when $\lambda$ exceeds the limit, a corresponding alarm and/or shutdown operation is performed.

Generally speaking, the method for detecting wear data of a protective bearing provided in the embodiment of the present application is an online evaluation method of a state of the protective bearing. On a premise of hardly adding hardware, a displacement sensor of a magnetic suspension bearing system itself is used for collecting a displacement of a rotor in a current falling process, a speed sensor is used for collecting a rotation speed of the rotor at any moment during contact time, and collected data is processed online by a CPU. A friction state evaluation value M and a collision state evaluation value N of the protective bearing are calculated, which are normalized respectively and then used for determining current wear information $\lambda 1$. Combined with historical wear information $\lambda 0$, total wear information $\lambda$ may be generated, which is recorded in a memory as a "medical record" of the protective bearing to guide an equipment user to confirm and maintain the state of the protective bearing.

A working process of the magnetic suspension bearing system may be further described with reference to the method for detecting wear data of a protective bearing mentioned above: when a rotor falls, control functions of the first actuator 5 of the magnetic suspension bearing and the second actuator 7 of the magnetic suspension bearing are lost, and the CPU 1 turns off the power amplifier 3 to avoid further damage to the system by an electromagnetic force, and the rotor 10 rotating at a high speed falls, causing collision and contact friction with the protective bearing 6. A real-time displacement of the rotor is measured by the displacement sensor 8 and sent to the CPU 1 through the A/D conversion module 9, so that the CPU 1 may acquire the real-time displacement of the rotor. The speed sensor 4 measures a real-time rotation speed of the rotor and sends the real-time rotation speed to the CPU1, so that the CPU 1 may acquire the real-time rotation speed of the rotor. The CPU 1 cumulatively calculates a collected displacement signal and a collected rotation speed signal through a preset algorithm, and stops calculation when the rotation speed of the rotor falls below a preset minimum value, and a current friction state value M and a current collision state value N are obtained. The CPU 1 calculates current wear information $\lambda 1$, reads historical wear information $\lambda 0$ from a memory, and stores $\lambda = \lambda 1 + \lambda 0$ as total wear information (which will become historical wear information for a next rotor fall) into the memory. If $\lambda$ exceeds a preset evaluation value (such as 0.8), a user will be prompted to replace the protective bearing.

A method for calculating a wear state value is as follows: comprehensively considering wear of a protective bearing caused by two physical processes, i.e., friction and collision, the wear state value may include a friction state value M and a collision state value N, and factors considered include collision, friction linear velocity, friction time, etc. However, there are many evaluation methods for a bearing state, and factors considered are not limited to collision, friction linear velocity, friction time, etc. Therefore, an example is taken here to illustrate one of them. A displacement value measured by the displacement sensor 8 directly reflects a contact situation between the rotor 10 and the protective bearing 6. First, a normal maximum displacement value A of the rotor 10 when it falls on the protective bearing 6 is measured at a calibration stage of the displacement sensor 8. In case of occurrence of falling, when the CPU 1 detects that a rotor displacement value x is greater than the normal maximum displacement value A, it is determined that the rotor 10 is in friction with the protective bearing 6, and a friction state value M is calculated in combination with a current rotation speed n detected by the speed sensor 4. M represents severity of each friction, so it is a state value and it is a variable. When CPU 1 detects that the displacement value x of the rotor changes from less than A to greater than A, it is determined there is a collision, and the number of times of collisions N is increased by 1, and there may be multiple collisions in a single time of falling, all of which need to be recorded. Therefore, a purpose of the preset collision formula in the step S202 may be understood as cumulative calculation of the number of times of collisions.

Key points of the embodiment of the present application are to use a real-time displacement value measured by the displacement sensor to observe a current falling process such as collision, friction, and etc. between the rotor 10 and the protective bearing 6, to continuously calculate a wear state of the protective bearing 6 on-line in combination with a rotation speed of the rotor, and to evaluate a result of the state of the protective bearing through a record of the current falling process. It may be seen from FIG. 2 that since the speed sensor 4 and the displacement sensor 8 in the present application are both non-contact with a protective bearing, that is, the displacement sensor 8 and the speed sensor 4 can measure the displacement and the rotation speed of the rotor without being installed at a position of the protective bearing.

The present application is to evaluate a state of a protective bearing in any magnetic suspension bearing. A focus of the present application is not on observation and evaluation of the protective bearing itself, but on pre-examination and operation reproduction of a behavior of a rotor. For example, under an operation behavior of pure friction, an evaluation value M0 that the protective bearing may withstand is pre-examined. Influencing factors of the evaluation value M0 are a rotation speed of the rotor and friction time. In actual evaluation, the evaluation value may be obtained only by determining whether friction occurs or not according to observation on the rotor and by recording friction time. M0 is a definite value for each type of magnetic suspension bearing system. It is a constant, so it is called a friction constant. Similarly, N0 is also used for determining and evaluating such behavior of collision between the rotor and the protective bearing. In addition, there is no limitation on types of the protective bearing in the present application. Besides a rolling bearing, the protective bearing may also be in a form of a sliding bearing and the like.

In the embodiment of the present application, under a premise of no need of installing a pressure sensor, evaluation of a wear state of a protective bearing is implemented through measurement of a displacement and a rotation speed of a rotor, two physical processes i.e., friction and collision are adequately considered, and wear of the protective bearing is more comprehensively evaluated. The displacement sensor 8, the CPU 1, the A/D conversion module 9, the power amplifier 3, and etc. may all be selected as original modules of a magnetic suspension bearing system, without adding new hardware investment, which is convenient for implementation and low in cost. Real-time online evaluation of the state of the protective bearing may be implemented without shutdown of a machine, which provides convenience for use and maintenance of equipment. When the protective bearing is seriously worn, an equipment user may be informed to replace it in time to avoid further damage to the equipment.

Embodiment 2

An embodiment of the present application provides an apparatus for detecting wear data of a protective bearing, which is mainly used for implementing the method for detecting wear data of the protective bearing according to the above-described contents of the Embodiment 1. The apparatus for detecting the wear data of the protective bearing according to the embodiment of the present application will be introduced in detail below.

Figure 4:
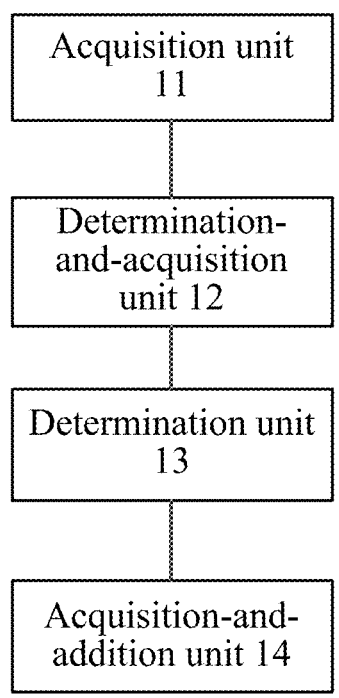
FIG. 4 is a schematic diagram of a structure of an apparatus for detecting wear data of a protective bearing according to an embodiment of the present application.

FIG. 4 is a schematic diagram of a structure of an apparatus for detecting wear data of a protective bearing according to an embodiment of the present application. As shown in FIG. 4, the apparatus for detecting the wear data of the protective bearing includes an acquisition unit 11, a determination-and-acquisition unit 12, a determination unit 13, and an acquisition-and-addition unit 14.

The acquisition unit 11 is configured to acquire a displacement and a rotation speed of a rotor in a current falling process.

The determination-and-acquisition unit 12 is configured to determine contact time of the rotor and the protective bearing according to the displacement, and acquire a rotation speed of the rotor at any moment during the contact time.

The determination unit 13 configured to determine current wear information of the protective bearing based on the displacement and the rotation speed, wherein the current wear information is used for reflecting a wear degree of the rotor to the protective bearing in the current falling process.

The acquisition-and-addition unit 14 is configured to acquire historical wear information of the protective bearing, and add the historical wear information to the current wear information to obtain total wear information of the protective bearing, wherein the historical wear information is used for reflecting a wear degree of the rotor to the protective bearing during a historical falling process, and the total wear information is used for reflecting a state of the protective bearing.

The apparatus for detecting the wear data of the protective bearing according to the present application includes: firstly, a displacement and a rotation speed of a rotor in a current falling process is acquired using an acquisition unit 11; then, contact time between the rotor and the protective bearing is determined using the determination-and-acquisition unit 12 according to the displacement, and a rotation speed of the rotor at any moment during the contact time is acquired. Then, the determination unit 13 is configured to determine current wear information of the protective bearing based on the displacement and the rotation speed. Finally, historical wear information of the protective bearing is acquired using the acquisition-and-addition unit 14, and the historical wear information and the current wear information are added to obtain total wear information of the protective bearing, wherein the total wear information is used for reflecting a state of the protective bearing. In the embodiment of the present application, there is no need to install a pressure sensor on a protective bearing, and the current wear information of the protective bearing may be indirectly obtained through the acquisition unit 11, the determination-and-acquisition unit 12, and the determination unit 13, and then the total wear information of the protective bearing may be obtained. Therefore, the present application may avoid technical problems of a complex structure, high costs, and poor reliability caused by the need of installation of a pressure sensor, and has beneficial effects of a simple structure, low costs, and strong reliability.

In an exemplary embodiment, the determination unit 13 includes a first calculation module, a second calculation module, a first normalization processing module, and a first determination module.

The first calculation module is configured to calculate a current friction value of the protective bearing according to the rotation speed and a preset friction formula, or according to the displacement, the rotation speed, and a preset friction formula.

The second calculation module is configured to calculate a current collision value of the protective bearing according to the displacement and a preset collision formula.

The first normalization processing module is configured to normalize the current friction value and the current collision value respectively to obtain a normalized friction value and a normalized collision value.

The determination module is configured to determine current wear information of the protective bearing based on the normalized friction value and the normalized collision value.

In an exemplary embodiment, the determination module is configured to determine the current wear information of the protective bearing based on the normalized friction value, the normalized collision value, and a first preset evaluation formula.

In an exemplary embodiment, the determination unit 13 further includes a time domain and frequency spectrum analysis module and a second determination module.

The time domain and frequency spectrum analysis module is configured to determine whether the rotor whirls or not by performing time domain and frequency spectrum analysis on the displacement.

The determination module is configured to determine the current wear information of the protective bearing based on the normalized friction value, the normalized collision value, and a second preset evaluation formula when the rotor whirls.

In an exemplary embodiment, the determination unit 13 further includes an acquisition module, a second normalization processing module, and a third determination module.

The acquisition module is configured to acquire a current temperature value of the protective bearing.

The second normalization processing module is configured to normalize the current temperature value to obtain a normalized temperature value.

The determination module is configured to determine current wear information of the protective bearing based on the normalized friction value, the normalized collision value, the normalized temperature value, and a third preset evaluation formula.

In an exemplary embodiment, the apparatus further includes a calculation unit, wherein the calculation unit is configured to calculate a ratio between the total wear information and preset maximum allowable wear information to obtain a ratio result.

In an exemplary embodiment, the apparatus further includes a display unit, wherein the display unit is configured to display the ratio result in a target display mode, and the target display mode includes at least one of following: progress bar, percentage, and indicator light.

In an exemplary embodiment, the apparatus further includes an alarm and shutdown unit, wherein the alarm and shutdown unit is configured to give an alarm when the total wear information exceeds a preset alarm threshold, and/or to perform a shutdown operation on a magnetic suspension bearing system where the protective bearing is located when the total wear information exceeds a preset shutdown threshold.

Those skilled in the art may clearly understand that for convenience and conciseness of description, specific working processes of the above-described apparatuses and units may refer to corresponding processes in the above-mentioned method embodiments, which will not be repeated here.

In an exemplary embodiment, the embodiment further provides a computer-readable medium with non-volatile program codes executable by a processor, wherein the program codes enable the processor to perform the methods of the above method embodiments.

It may be understood by those skilled in the art that all or some of the steps in the methods, functional modules/units in the systems and apparatuses disclosed above may be implemented as software, firmware, hardware, and appropriate combinations thereof. In a hardware implementation mode, a division between functional modules/units mentioned in the above description does not necessarily correspond to a division of physical components; for example, a physical component may have multiple functions, or a function or step may be cooperatively performed by several physical components. Some or all of the components may be implemented as software executed by a processor, such as a Digital Signal Processor or a microprocessor, or implemented as hardware, or implemented as an integrated circuit, such as an Application Specific Integrated Circuit. Such software may be distributed on a computer-readable medium, which may include a computer storage medium (or a non-transitory medium) and a communication medium (or a transitory medium). As well known to those of ordinary skills in the art, the term computer storage medium includes a volatile, nonvolatile, removable, and non-removable medium implemented in any method or technology for storing information (such as computer readable instructions, a data structure, a program module, or other data). A computer storage medium includes but is not limited to a Random Access Memory (RAM), a Read Only Memory (ROM), an Electrically Erasable Programmable Read-Only Memory (EEPROM), a flash memory, or another memory technology, a Compact Disk-Read Only Memory (CD-ROM), a Digital Versatile Disk (DVD), or another optical disk storage, a magnetic box, a magnetic tape, a magnetic disk storage, or another magnetic storage apparatus, or any other medium that may be configured to store desired information and may be accessed by a computer. Furthermore, it is well known to those of ordinary skills in the art that a communication medium generally contains computer readable instructions, a data structure, a program module, or other data in a modulated data signal such as a carrier wave or another transmission mechanism, and may include any information delivery medium.

The invention claimed is:

1. A method for detecting wear data of a protective bearing, applied to a magnetic suspension bearing system comprising a displacement sensor, a speed sensor, a processor and the protective bearing, wherein the method comprises:
    acquiring, by the displacement sensor, a displacement of a rotor in a current falling process;
    determining, by the processor, contact time of the rotor and the protective bearing according to the displacement, and acquiring, by the speed sensor, a rotation speed of the rotor at any moment during the contact time;
    determining, by the processor, current wear information of the protective bearing based on the displacement and the rotation speed, wherein the current wear information is used for reflecting a wear degree of the rotor to the protective bearing in the current falling process;
    acquiring, by the processor, historical wear information of the protective bearing, and adding, by the processor, the historical wear information to the current wear information to obtain total wear information of the protective bearing, wherein the historical wear information is used for reflecting a wear degree of the rotor to the protective bearing in a historical falling process, and the total wear information is used for reflecting a state of the protective bearing; and
    performing, by the magnetic suspension bearing system, a shutdown operation when the total wear information exceeds a preset shutdown threshold.

2. The method according to claim 1, wherein determining, by the processor, the current wear information of the protective bearing based on the displacement and the rotation speed comprises:
    calculating, by the processor, a current friction value of the protective bearing according to the rotation speed and a preset friction formula, or according to the displacement, the rotation speed, and a preset friction formula;
    calculating, by the processor, a current collision value of the protective bearing according to the displacement and a preset collision formula;
    normalizing, by the processor, the current friction value and the current collision value respectively to obtain a normalized friction value and a normalized collision value; and
    determining, by the processor, the current wear information of the protective bearing based on the normalized friction value and the normalized collision value.

3. The method according to claim 2, wherein determining, by the processor, the current wear information of the protective bearing based on the normalized friction value and the normalized collision value comprises:
    Determining, by the processor, the current wear information of the protective bearing based on the normalized friction value, the normalized collision value, and a first preset evaluation formula.

4. The method according to claim 2, further comprising: determining, by the processor, whether the rotor whirls or not by performing time domain and frequency spectrum analysis on the displacement;
    determining, by the processor, the current wear information of the protective bearing based on the normalized friction value and the normalized collision value comprises:
    determining, by the processor, the current wear information of the protective bearing based on the normalized friction value, the normalized collision value, and a second preset evaluation formula when the rotor whirls.

5. The method according to claim 2, further comprising:
    normalizing, by the processor, a current temperature value of the protective bearing to obtain a normalized temperature value;
    determining, by the processor, the current wear information of the protective bearing based on the normalized friction value and the normalized collision value comprises:
    determining, by the processor, the current wear information of the protective bearing based on the normalized friction value, the normalized collision value, the normalized temperature value, and a third preset evaluation formula.

6. The method according to claim 1, further comprising:
    calculating, by the processor, a ratio between the total wear information and preset maximum allowable wear information to obtain a ratio result.

7. The method according to claim 6, further comprising:
    displaying, by the magnetic suspension bearing system, the ratio result in a target display mode, wherein the target display mode comprises at least one of following: progress bar, percentage, and indicator light.

8. The method according to claim 1, further comprising:
alarming, by the magnetic suspension bearing system when the total wear information exceeds a preset alarm threshold.

9. A magnetic suspension bearing system, comprising a displacement sensor, a speed sensor, a processor and a protective bearing, wherein:
the displacement sensor is configured to acquire a displacement of a rotor in a current falling process;
the processor is configured to determine contact time of the rotor and the protective bearing according to the displacement, and the speed sensor is configured to acquire a rotation speed of the rotor at any moment during the contact time;
the processor is configured to determine current wear information of the protective bearing based on the displacement and the rotation speed, wherein the current wear information is used for reflecting a wear degree of the rotor to the protective bearing in the current falling process; and
acquire historical wear information of the protective bearing and add the historical wear information to the current wear information to obtain total wear information of the protective bearing, wherein the historical wear information is used for reflecting a wear degree of the rotor to the protective bearing in a historical falling process, and the total wear information is used for reflecting a state of the protective bearing;
wherein the magnetic suspension bearing system is configured to perform a shutdown operation when the total wear information exceeds a preset shutdown threshold.

10. The magnetic suspension bearing system according to claim 9, wherein the processor is configured to:
calculate a current friction value of the protective bearing according to the rotation speed and a preset friction formula, or according to the displacement, the rotation speed, and a preset friction formula;
calculate a current collision value of the protective bearing according to the displacement and a preset collision formula;
normalize the current friction value and the current collision value respectively to obtain a normalized friction value and a normalized collision value; and
determine the current wear information of the protective bearing based on the normalized friction value and the normalized collision value.

11. The magnetic suspension bearing system according to claim 10, wherein
the processor is configured to determine the current wear information of the protective bearing based on the normalized friction value, the normalized collision value, and a first preset evaluation formula.

12. The magnetic suspension bearing system according to claim 10, wherein the processor is configured to:
determine whether the rotor whirls or not by performing time domain and frequency spectrum analysis on the displacement; and
determine the current wear information of the protective bearing based on the normalized friction value, the normalized collision value, and a second preset evaluation formula when the rotor whirls.

13. The magnetic suspension bearing system according to claim 10, wherein the processor is configured to;
normalize a current temperature value of the protective bearing to obtain a normalized temperature value; and
determine the current wear information of the protective bearing based on the normalized friction value, the normalized collision value, the normalized temperature value, and a third preset evaluation formula.

14. The magnetic suspension bearing system according to claim 9, wherein:
the processor is further configured to calculate a ratio between the total wear information and preset maximum allowable wear information to obtain a ratio result;
magnetic suspension bearing system is further configured to display the ratio result in a target display mode, wherein the target display mode comprises at least one of following: progress bar, percentage, and indicator light; and
the magnetic suspension bearing system is configured to give an alarm when the total wear information exceeds a preset alarm threshold.

15. A non-transitory computer-readable medium with non-volatile program codes executable by a processor, wherein the program codes enable the processor to perform the method according to claim 1.

* * * * *